United States Patent
Skala

(10) Patent No.: US 6,307,289 B1
(45) Date of Patent: Oct. 23, 2001

(54) ELECTRICAL MACHINE WITH RECTIFIER UNIT AND PLUS AND MINUS HEAT SINKS WITH IMPROVED LOST HEAT DISSIPATION

(75) Inventor: Peter Skala, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,985

(22) PCT Filed: Jan. 18, 1999

(86) PCT No.: PCT/DE99/00087

§ 371 Date: Feb. 17, 2000

§ 102(e) Date: Feb. 17, 2000

(87) PCT Pub. No.: WO00/01055

PCT Pub. Date: Jan. 6, 2000

(30) Foreign Application Priority Data

Jun. 26, 1998 (DE) .............................................. 198 28 518

(51) Int. Cl.[7] .................................................. H02K 19/36
(52) U.S. Cl. ............................................................ 310/68 D
(58) Field of Search ..................... 310/68 B, 64; 363/145

(56) References Cited

U.S. PATENT DOCUMENTS

| | | | |
|---|---|---|---|
| 4,055,778 | * 10/1977 | Binder .................................. | 310/89 |
| 5,451,823 | 9/1995 | Deverall et al. .................... | 310/68 D |
| 5,828,564 | * 10/1998 | Mori et al. ............................ | 363/141 |
| 5,949,166 | * 9/1999 | Ooiwa et al. ....................... | 310/68 D |
| 5,955,805 | * 9/1999 | Chaudoreille et al. ................. | 310/90 |

FOREIGN PATENT DOCUMENTS

| | | | | |
|---|---|---|---|---|
| 197 05 228 A1 | * | 8/1998 | (DE) .................................. | 310/68 D |
| 480 372 A1 | * | 4/1992 | (EP) .................................. | 310/68 D |
| 671804 A1 | * | 2/1995 | (EP) .................................. | 310/68 D |
| 6-98511 | * | 4/1994 | (JP) .................................. | 310/68 D |

* cited by examiner

Primary Examiner—Karl Tamai
(74) Attorney, Agent, or Firm—Michael J. Striker

(57) ABSTRACT

An electric machine, preferably a rotary current generator (10) with a rectifier unit (26) on the rear end region of its bearing plate (12), is proposed in which the dissipation of its lost heat is to be improved. PLUS and MINUS heat sinks (27, 28) with the MINUS and PLUS diodes (31, 32) are screwed firmly in sandwichlike fashion, insulated from one another, to a circuit board (30) for the switching connections between diodes and winding terminals (17A) on the bearing plate (12). In particular to improve the cooling of the MINUS diodes (31), these diodes are in direct metal-to-metal contact by their bases (31a) with the bearing shield (12) there.

2 Claims, 3 Drawing Sheets

ELECTRICAL MACHINE WITH RECTIFIER UNIT AND PLUS AND MINUS HEAT SINKS WITH IMPROVED LOST HEAT DISSIPATION

BACKGROUND OF THE INVENTION

The invention relates to a multi-voltage electrical system for a vehicle.

In a known version of this kind (U.S. Pat. No. 5,451,823), the PLUS and MINUS diodes of a rectifier unit are each secured to a so-called heat sink and electrically connected to it via a housing terminal. The heat sinks are secured in sandwich fashion with an intervening insulator plate on the end face of a bearing plate for a rotary current generator. The lower heat sink is mounted electrically and thermally conductively on the end face of the bearing plate. A circuit board is located on the upper heat sink and has a number of bus bars—embedded in the plastic of the circuit board, for the connection of one PLUS diode and one MINUS diode each on the one hand and for the winding ends of the rotary current winding in the stator of the rotary current generator on the other. This rectifier unit is held together by rivets and is secured with screws to the rotary current generator. For cooling of the upper, curved heat sink, this body is provided with many cooling slits, located side by side in the region of its inside circumference, which are oriented axially to the axis of the electric machine and through which an axial cooling air stream is drawn in from outside to a fan secured to the rotor of the generator. The cooling air blown radially outward by the fan in a known manner through slits on the outer circumference of the bearing plate.

In this known version, it is disadvantageous that the openings, provided for the cooling air to flow through, in the upper heat sink of the unit have relatively small cooling surface areas for heat dissipation, and thus a relatively thick upper heat sink is needed in order to provide an adequate cooling surface area at the cooling air openings. Because of the attendant accumulation of material required, the upper heat sink used here is correspondingly expensive and heavy. Furthermore, to attain a large cooling area for the cooling air flow, the openings in the heat sink are embodied as narrow, radially extending slits, which in turn present relatively high air resistance to the cooling air stream. As a result, the air volume aspirated through these slits is small, and thus the cooling action is also only slight. Using higher-power fans leads to greater expense and increased flow noise.

A further disadvantage of the known generators of this type is that in the rectifier unit, the heat is carried from the MINUS diode bases to the MINUS heat sinks. From there some of the heat is given up—as noted above—directly to the air, while some is transferred via fastening points to the bearing plate and from there is given up to the air. As a result, most of the dissipated heat is absorbed by the air before it enters the interior of the generator. In generators where conversely the MINUS heat sink rests flat on the slip ring bearing plate, the heat flows from the MINUS diode base to the air via the MINUS heat sink and the bearing plate. However, this version requires an especially rigid heat sink and machined bearing faces of large area.

SUMMARY OF THE INVENTION

The electric machine according to the invention has the advantage over the prior art that the heat of the MINUS diodes is better dissipated than with a heat sink resting on the housing, because the MINUS diodes here rest directly on the bearing plate themselves. No additionally machined surfaces are needed; a large proportion of the heat generated at the MINUS diodes is not given up to the air from the bearing plate until the air leaves the generator; that is, the internal components receive cooler air. Thus the majority of the heat generated at the MINUS diodes flows directly into the bearing plate, and a lesser portion of the heat flows via the MINUS heat sink to the bearing plate and into the air.

DESCRIPTION OF THE PREFERRED EMBODIMENTS

Figure 1:
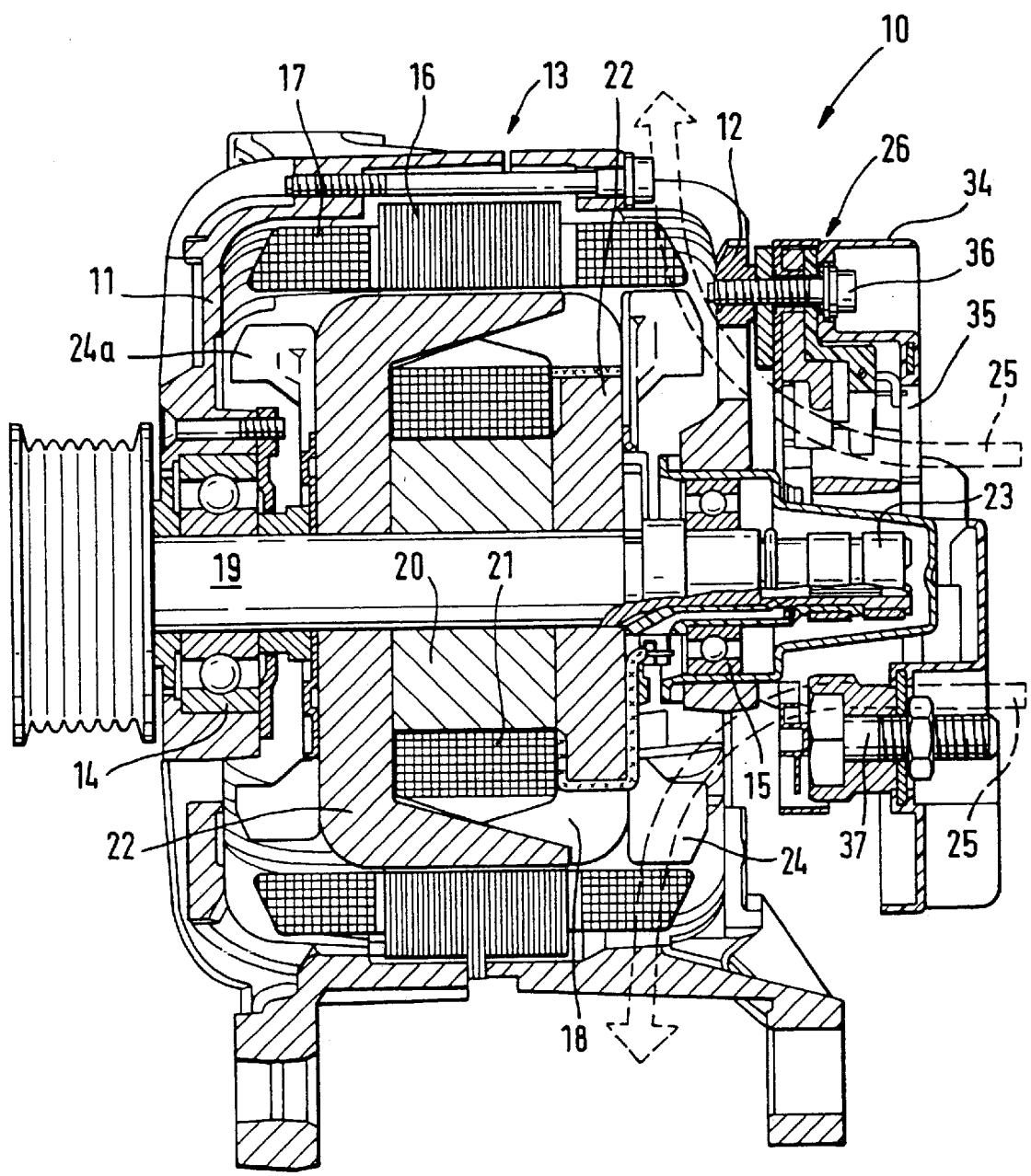
FIG. 1 shows a rotary current generator with a rectifier unit on the rear bearing plate in longitudinal section.

In FIG. 1, a rotary current generator for motor vehicles is indicated at 10. It has a die-cast housing 13 made up of two half-shells 11, 12; the front half-shell 11 is embodied as a bearing plate for a drive bearing 14, and the rear half-shell 12 is embodied as a bearing plate for a smaller ball bearing 15. The two half-shells of the housing 13 fix a stator lamination packet 16, which in a known manner receives a three-phase stator winding 17 for generating a rotary current. In the so-called stator bore of the stator lamination packet, a claw pull rotor 18 is disposed, which is supported by its rotor shaft 19 in the bearings 14, 15. The rotor shaft 17, in its middle region, carries a magnetically conductive annular core 20, on which a exciter winding 21 is disposed. On both sides thereof, a respective claw pole board 22 is secured on the rotor shaft 19, and its claw pull prongs mesh with one another in spaced-apart fashion to form an alternating field.

To supply current to the exciter winding 21, a slip ring arrangement 23 is provided on the rear end of the rotor shaft 19; of this arrangement, one slip ring each is connected to one end of the exciter winding 21. The slip rings cooperate in a known manner with a carbon brush device, not shown, with which a controller is integrated, with which the direct current flowing in the exciter winding is controlled to suit the demand in the on-board electrical system of the motor vehicle. On the inside of the rear half-shell 11, a fan 24 is secured to the face end of the claw pull board 22; through corresponding slits on the face end of the half-shell 12, the fan axially aspirates a cooling air stream 25 and blows it radially outward past the rear winding head of the stator winding 17 through outer slits of the rear half-shell. A second fan 24a is located on the face end of the front claw pull board in the interior of the front half-shell 11, in order here as well to aspirate a cooling air stream axially through slits in the housing half 11 and blow it radially outward past the front winding head of the stator winding 17 through housing slits located on the outside. A rectifier unit 26, which on its input side is connected in a known manner to the winding outputs of the stator winding 17 to rectify the rotary current induced there, is located on the outer face end of the rear half-shell 12, in the cooling air stream 25 aspirated axially by the rear fan 24. At the output of the rectifier unit 26, the direct voltage required for supply to the on-board motor vehicle electrical system can be picked up in a known manner.

Figure 2:
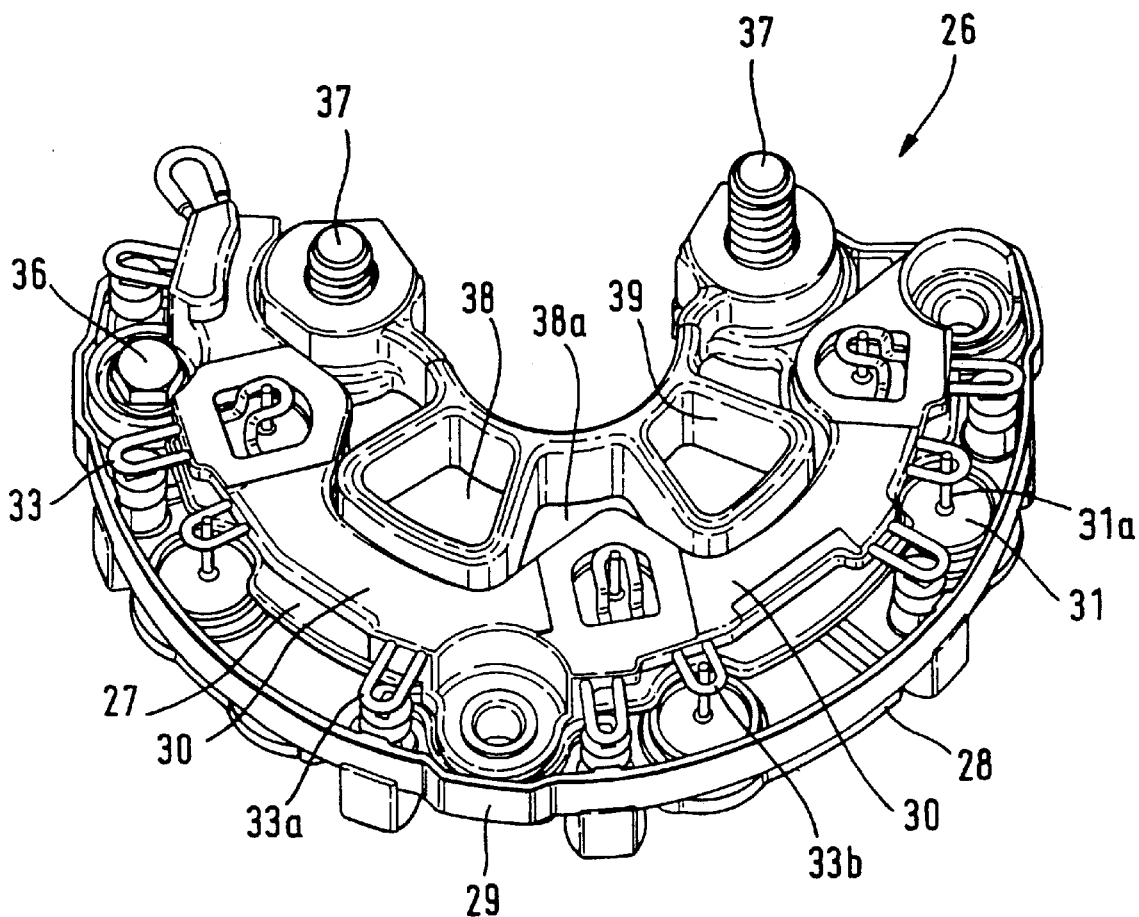
FIG. 2 shows the rectifier unit in a three-dimensional view.
Figure 3:
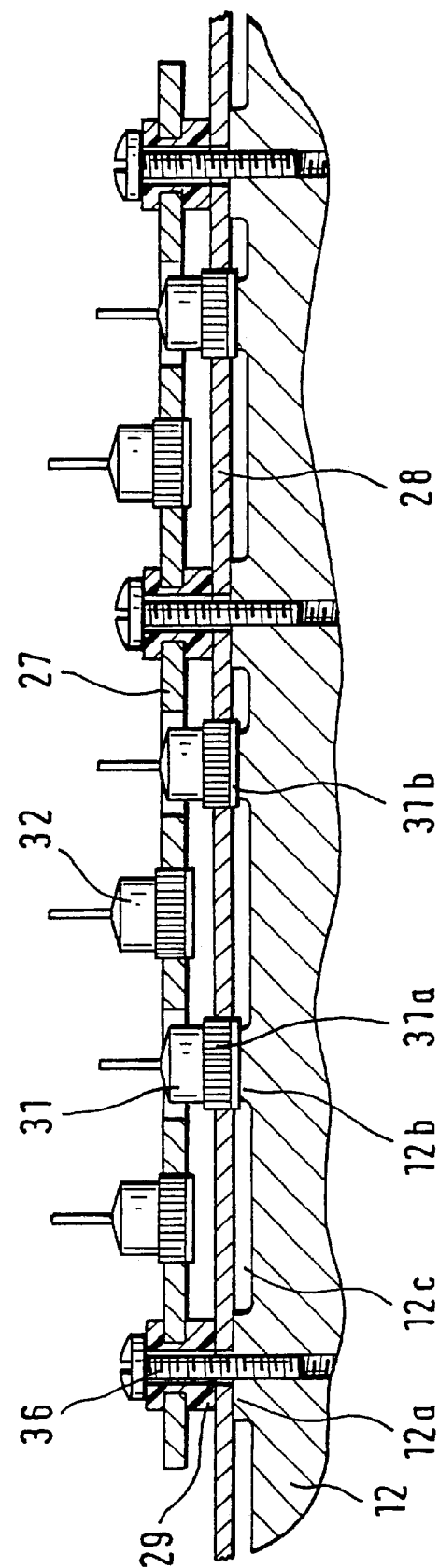
FIG. 3, in a semi-schematic, developed sectional view, shows the unit comprising the plus and MINUS heat sinks, whose MINUS diodes rest on the bearing plate.

Details of the rectifier unit 26 can be seen in FIGS. 2 and 3. Thus the rectifier unit 26 comprises a platelike PLUS heat sink 27 and a MINUS heat sink 28 of thermally conducting metal, preferably aluminum. The two opposed heat sinks 27, 28 are electrically insulated from one another by an insulator plate 29 and secured, together with a circuit board 30 disposed on the upper heat sink 27, in sandwichlike fashion on the end region of the bearing plate of the machine that forms the rear half-shell 12.

In the MINUS heat sink 28, a plurality of MINUS diodes 31 are pressed into preferably fluted bores by their anode terminal. In the same way, a plurality of PLUS diodes 32 are pressed in on the cathode side of the PLUS heat sink 27. The series circuit of one MINUS diode 31 and one PLUS diode 32 each along with their interconnection with end of the stator winding 17 is effected via line wires 33, which are embedded, except for their terminal ends 33a, in the circuit board 30. The rectifier unit 26 is covered toward the outside by a plastic protective cap 34, although this cap is provided with openings 35 suitably disposed on its face end to allow the cooling air stream 25 to enter. The circuit board 30, PLUS heat sink 27, insulator plate 29, and MINUS heat sink 28, stacked one above the other, are firmly screwed with fastening screws 36 to the face end of the rear half-shell 12. This protective cap 34 is also secured to the PLUS heat sink 27 by connection screws 37.

The lost heat of the rectifier unit 26 is dissipated, on the one hand via a heat-conducting contact of the MINUS diodes 31 and the lower MINUS heat sink 28 to pedestals 12a and 12b on the bearing shield of the rear housing half 12, and on the other via the cooling air stream 25 of the fan 24 from the upper PLUS heat sink 27, because this upper PLUS heat sink has a plurality of cooling air openings 38, disposed side by side in the inner circumferential region, for the axial passage therethrough of the cooling air stream 25. Reference will made here only to FIG. 3, from which it can be seen how the MINUS diodes 31 protrude with their bases 31a past the contour of the MINUS heat sink 28 and rest with their bases 31 a directly on pedestals 12b embodied on their chamfers (31b) of the rear half-shell which forms the bearing plate 12, or in other words are directly in contact with it, and not—as was the case until now—only via the MINUS heat sinks at the fastening points by means of the screws 36. Because of this direct contact of the MINUS diodes 31 with the bearing plate—specifically with initial tension through the small pedestals 12b on the undersides of the MINUS diodes 31—the majority of the heat generated at these MINUS diodes 31 flows directly into the rear half-shell which forms the bearing plate 12, and a lesser proportion of the heat flows via the MINUS heat sink 28 to the bearing plate and the air. Furthermore, to attain the best possible dissipation of this lost heat from the PLUS heat sink 27 to the cooling air stream 25, axially oriented cooling fins 39 are formed onto the cooling air openings 38 there. By means of these cooling fins, the surface area of the PLUS heat sink 27 exposed to the cooling air stream 25 is greatly increased. Thus the cooling air openings 38 can be enlarged as well, and as a consequence, the proportion of the cooling air stream 25 flowing through these cooling air openings can also be increased.

What is claimed is:

1. An electrical machine formed as a rotary current generator, comprising a housing; a rotor rotatably supported in said housing; and a rectifier unit with MINUS and PLUS diodes which are mounted, insulated from one another, on a MINUS and a PLUS heat sink and are secured in a sandwich fashion, together with a circuit board for diode terminals, to an end region of a bearing plate, so that a lost heat of said rectifier unit is dissipatable from the PLUS heat sink which is an upper heat sink partly via a heat-conducting contact of said MINUS heat sink which is a lower heat sink with said bearing plate, and partly via at least one aspirating coolant airstream of a fan, said MINUS diodes secured in said MINUS heat sink and each having a base resting directly on said bearing plate, said MINUS diodes having pedestals which are embodied on said bearing plate and separated from one another by recesses.

2. An electrical machine as defined in claim 1, wherein said MINUS diodes rest with initial tension by said pedestals embodied on chamfers when said MINUS and PLUS heat sinks are screwed together, to said bearing plate.

* * * * *